United States Patent [19]

Frangesh

[11] Patent Number: 4,598,328

[45] Date of Patent: Jul. 1, 1986

[54] MECHANICAL DAMPER FOR DISK DRIVES HAVING BAND DRIVE ACTUATORS

[75] Inventor: Thomas P. Frangesh, Campbell, Calif.

[73] Assignee: Xerox Corporation, Stamford, Conn.

[21] Appl. No.: 493,132

[22] Filed: May 9, 1983

[51] Int. Cl.$^4$ .................. G11B 17/00; G11B 5/012
[52] U.S. Cl. ............................. 360/97; 74/574; 369/247; 360/106
[58] Field of Search .................. 360/97–99, 360/86, 137, 104–106; 369/247, 215; 188/378–379; 74/574

[56] References Cited

U.S. PATENT DOCUMENTS

| | | | |
|---|---|---|---|
| 3,545,301 | 12/1970 | Richter | 74/574 |
| 3,670,593 | 6/1972 | Troyer | 74/574 |
| 3,901,101 | 8/1975 | McGavern | 74/574 |
| 4,161,004 | 7/1979 | Dalziel | 360/106 |
| 4,185,309 | 1/1980 | Feldstein et al. | 360/97 |
| 4,307,627 | 12/1981 | Sullivan | 74/574 |

FOREIGN PATENT DOCUMENTS

0947493 8/1956 Fed. Rep. of Germany .
2084290 4/1982 United Kingdom .

OTHER PUBLICATIONS

E. E. Zimmermann, "Torsional Vibration Damper", IBM TDB, Nov. 1981, vol. 24, No. 6, p. 3088.
Kordik, Kenneth S., "Reducing Overshoot and Oscillation in Variable Reluctance Step Motors", Proceedings, Ninth Annual Symposium on Incremental Motion Control Systems and Devices, University of Illinois, Jun. 2–5, 1980, pp. 65–78.

*Primary Examiner*—John H. Wolff
*Assistant Examiner*—David J. Severin

[57] ABSTRACT

To damp a stepper motor powered band drive for a disk drive, there is a relatively inexpensive, but efficient mechanical damper comprising a predetermined inertial mass which is concentrically coupled to the capstan of the band drive by an energy absorbing elastomer. The mass, its geometry, and the energy absorbing characteristics of the elastomer are selected to apply a dynamic force to the stepper motor which opposes and counteracts any unwanted oscillation of the stepper motor as the read/write head of the disk drive arrives at a selected data track. This damper is relatively free of potential contaminants and is, therefore, particularly attractive for Winchester disk drives.

7 Claims, 2 Drawing Figures

MECHANICAL DAMPER FOR DISK DRIVES HAVING BAND DRIVE ACTUATORS

FIELD OF THE INVENTION

This invention relates to band drive actuators for rotating memories and, more particularly, to mechanical dampers for band drive actuators which are driven by open loop stepper motors.

BACKGROUND OF THE INVENTION

Effective damping is critically important to the successful utilization of stepper motors for driving the head positioning mechanisms or actuators of disk drives. The seek/settle times (i.e., the time required for a read/write head to come to rest on a selected data track) specified for modern disk drives are so short that provision is required to counteract the forces which tend to cause the read/write head to oscillate when it arrives at a selected data track. Indeed, some designers are proposing closed loop damping for the actuators of so-called low cost disk drives to meet the challenge of the shortened seek/settling times.

For purposes of this decription, the term "seek time" is used hereinbelow to refer to (1) the time that is required for the read/write head to move to a selected data track plus (2) the time that is required for the head to settle on that track, but others might prefer to call the sum of those two time periods the seek/settle time as hereinabove. "Seek," on the other hand, refers to the motor driven movement of the read/write head into nominal alignment with the selected data track, regardless of whether the head tends to oscillate upon reaching that location or not.

As is known, open loop driven stepper motors have been the drivers of choice for the actuators of low cost disk drives. They are relatively inexpensive, and they offer sufficient positioning accuracy and repeatability to satisfy the requirements of most floppy disk drives and even some Winchester disk drives. For example, such stepper motors have been successfully utilized in disk drives to power band drive actuators of the type described in U.S. Pat. No. 4,161,004, which issued July 10, 1979 on a "Head Positioning Mechanism for Recording/Playback Machine." Specifically, the Shugart SA850 disk drive is an example of a floppy disk drive which has an open loop stepper motor for operating the linear band drive actuator described in that patent, while the Shugart SA4000 is an example of a Winchester disk drive which has an open loop stepper motor for operating the rotary band drive actuator described in that patent.

For most disk drive applications, single track seek time is a critically important factor only if it exceeds the so-called latency time (i.e., the time required for the disk to make a complete revolution.) If that seek time is shorter than the latency time, the latency period determines the average single track data access time of the disk drive, which is the parameter that is usually of interest to the user.

It is well understood that stepper motors inherently are under damped systems. In particular, it is known that the rotor of such a motor experiences increased magnetic attraction as it rotates into alignment with the energized phase or winding of the motor and that the rotor will tend to overshoot and oscillate about its alignment position. Thus, substantial effort and expense have been devoted to the development of open and closed loop systems for damping such motors. Closed loop damping systems are beyond the scope of the present invention, but it will be understood that they usually are relatively costly. Moreover, it should be noted that closed loop damping has been favored, despite the expense, for disk drives having stepper motor driven actuators whenever the goal has been to ensure that the single track seek time is shorter than the latency time.

As will be appreciated, single track seek time is the shortest relevant seek time of a disk drive. However, even the seemingly unambitious goal of ensuring that the single track seek time is less than the latency period has been difficult to achieve while using an open loop stepper motor for the actuator, even though proposals have been made to reduce the step rate as the actuator completes its seek and to mechanically damp the stepper motor, such as with a viscous damper as in the Shugart SA1000 disk drive or with a frictional retard mechanism as in the aforementioned patent. Viscous dampers have been favored for mechanical damping because of their relatively straightforward first order damping characteristics, but they are relatively complex to manufacture and are a potential source of unwanted contaminents, especially in a Winchester disk drive environment where cleanliness is critical. For a more comprehensive discussion of the prior art, see Kordik, Kenneth S., "Reducing Overshoot and Oscillation in Variable Reluctance Step Motors," *Proceedings, Ninth Annual Symposium on Incremental Motion Control Systems and Devices,* University of Illinois, June 2–5, 1980, pp. 65–78.

SUMMARY OF THE INVENTION

In accordance with the present invention, there is a relatively inexpensive, but efficient dynamic mechanical damper which is particularly well suited for damping an open loop stepper motor powered band drive actuator for a disk drive. The damper comprises a predetermined inertial mass which is concentrically coupled to the capstan of the band drive by an energy absorbing elastomer. The mass, its geometry, and the energy absorbing characteristics of the elastomer are selected to apply a dynamic force to the stepper motor which opposes and counteracts any unwanted oscillation of the stepper motor as the read/write head of the disk drive arrives at a selected data track. Preferably, the deceleration profile of the stepper motor is controlled at the conclusion of each seek, such as in accordance with the teachings of a commonly assigned U.S. patent application of Larry M. Bryant which was filed May 9, 1983 under Ser. No. 493,131 on "Open Loop Acceleration/Deceleration Control for Disk Drive Stepper Motors", so that the damper may be optimized. In any event, it will be understood that the damper is relatively free of potential contaminants and is, therefore, particularly attractive for Winchester disk drives.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to a certain embodiment, it is to be understood that there is no intent to limit it to that embodiment. On the contrary, the aim is to cover all modifications, alternatives and equivalents falling within the spirit and scope of the invention as defined by the appended claims.

Figure 1:
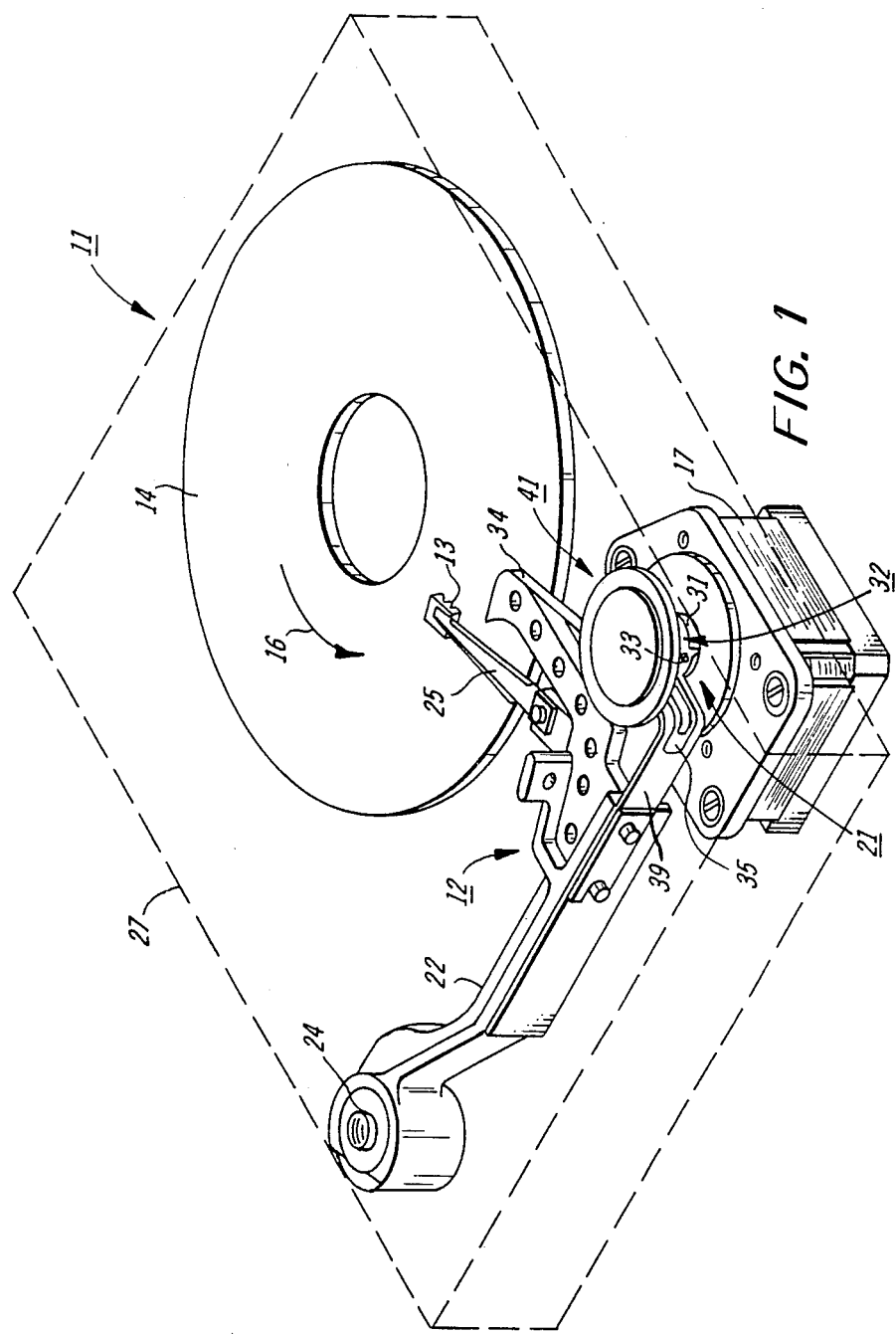
FIG. 1 is a simplified isometric view of a disk drive having a stepper motor driven actuator which is damped in accordance with the present invention.

Turning now to the drawings, and at this point especially to FIG. 1, there is a disk drive 11 (shown only in relevant part) having an actuator assembly 12 for aligning a read/write head 13 with a selected data track on a disk-like recording media 14. The recording media 14 is centrally mounted on a spindle (not shown) for rotation during operation in the direction of the arrow 16. The actuator assembly 12 is, in turn, driven by an open loop stepper motor 17 to position the read/write head 13 in response to a "seek" command, so that data may be written on or read from any one of a plurality of concentric data tracks on the recording media 14.

As illustrated, the recording media 14 is a rigid magnetic recording disk or platter for, say, a Winchester-type drive. However it will be evident that the broader aspects of this invention may be applied to other types of disk drives, such as floppy or flexible disk drives. Moreover, while only one read/write head 13 is shown, it will be understood that the actuator assembly 12 could be configured to support a plurality of such heads for multiple surface recording on one or more disks.

In keeping with accepted practices, the actuator assembly 12 comprises a band drive 21 for coupling an actuator arm 22 to the output or drive shaft 23 (FIG. 2) of the motor 17. As illustrated, one end of the actuator arm 22 is mounted through a suitable bearing (not shown) for rotation on a stationary shaft 24, and the read/write head 13 is supported by a more or less conventional cantilever-like flexure 25 which is secured (by means not shown) to the actuator arm 22 at a predetermined distance from the axis of the shaft 24 (i.e., the axis of rotation of the arm 22). Accordingly, the actuator assembly 12 is a socalled "rotary actuator" because the band drive 21 causes the actuator arm 22 to rotate on the shaft 24 in response to the incremental or step-like rotation of the motor drive shaft 23. Nevertheless, it will be apparent that the present invention could also be applied to "linear" band drive actuators.

As is known, in a Winchester-type disk drive, the configuration of the read/write head 13, the load applied thereto, and the flexure 25 are carefully selected so that the head 13 "flies" during operation on an air bearing at a predetermined, microscopic distance from the surface of the disk 14. Therefore, in such a disk drive, the actuator assembly 12 and the disk 14 are hermetically sealed in an air filtered housing or enclosure, generally indicated by the dashed lines 27, thereby reducing the risk of potentially harmful contaminants intervening between the head 13 and the disk 14. The stepper motor 17 typically is outside the sealed enclosure, but its flange 28 may be within the enclosure.

To rotate the actuator arm 22 under the control of the stepper motor 17, the band drive 21 comprises a capstan 31 which is pinned or otherwise secured to the motor drive shaft 23, and a substantially non-extensible band 32 which is attached to the capstan 31 and to the actuator arm 22. More particularly, the band 32 is secured to the capstan 31, as at 33, and is wrapped therearound so that its opposing segments 34 and 35 cross as they extend from the capstan 31 to connect to spaced apart points on the actuator arm 22. Consequently, when the motor 17 rotates the capstan 31 in, say, a clockwise direction, the right hand segment 34 of the band 32 feeds off the capstan 31 while the left hand segment 35 is being taken up by the capstan 31, thereby causing counterclockwise rotation of the actuator arm 22 so that the read/write head 13 moves toward the center of the disk 14. As will be appreciated, precisely the opposite action takes place when the capstan 31 is rotated in the opposite or counterclockwise direction to move the head 13 toward the outer edge of the disk 14. Preferably, the two segments 34 and 35 of the band 32 are of approximately equal length and of substantially different widths, so that the wider segment 35 may be split to allow the narrower segment 34 to be threaded therethrough. In that event, the diameter of the capstan 31 is selected so that less than one complete revolution of the capstan 31 is sufficient to move the read/write head 13 from the outermost of the innermost track on the disk 14, or vice-versa. To avoid unwanted backlash, a cantilever leaf spring 39 or the like is connected between the actuator arm 22 and one of the segments, say the segment 35, of the band 32, thereby applying a substantially constant tension to the band 32.

Figure 2:
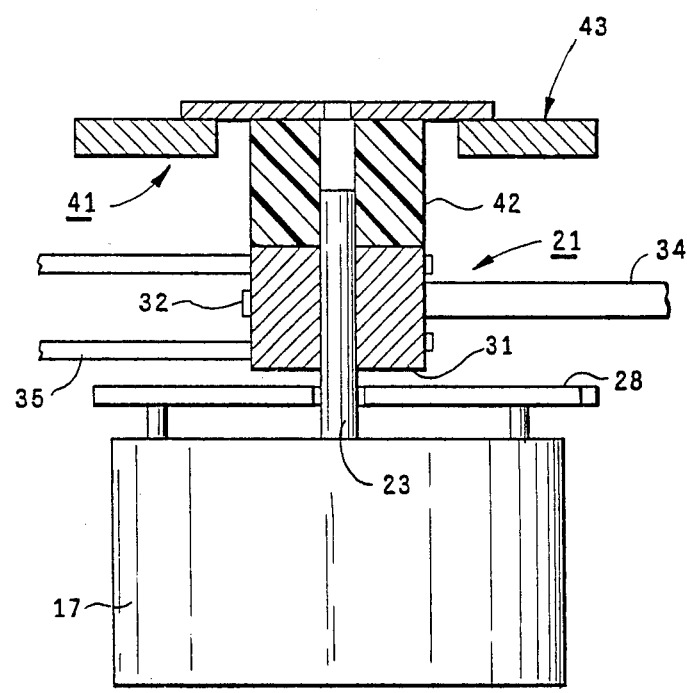
FIG. 2 is an enlarged, partially schematic, sectional view of the band drive and damper for the actuator shown in FIG. 1.

In accordance with the present invention, as best shown in FIG. 2, there is a damper 41 comprising an energy absorbing elastomeric member 42 for coupling a predetermined inertial mass 43 to the capstan 31 of the band drive 21. The damper 41 is symmetrical about the axis of rotation of the capstan 31 so that the band drive 21 is balanced. As will be appreciated, an important advantage of the damper 41 is that its solid state (i.e., fluid free) construction enables it be mounted within the sealed enclosure 27 (FIG. 1) of a Winchester disk drive with little, if any risk, that it will ever become a source of unwanted contaminants.

To carry out this invention, one end of the elastomeric member 42 is secured to the band drive capstan 31 and its opposite end is secured to the inertial mass 43, so that the mass 43 applies torque to the elastomeric member 42 in response to any change in the rotational rate of the capstan 31. The elastomeric member 42 is formed from a material having very little resiliency so that it efficiently absorbs the energy applied thereto, and the spring rate of the elastomeric member 42 is selected so that the mass 43 tends to oscillate in phase opposition with the stepper motor 17 at the completion of a seek. In other words, the natural frequency of the damper 41 is selected to be substantially equal to the frequency at which the head 13 tends to oscillate at the conclusion of a seek (i.e., the natural frequency of the actuator assembly 12). Thus, the torque generated by the mass 43 retards or damps out the unwanted, stepper motor induced, oscillation of the actuator arm 22 and read/write head 13.

The damping efficiency of the damper 41 depends on several mutually dependent factors, including the spring rate and inertia of the system that is to be damped, the spring rate and inertia of the damper 41, and the damping or energy absorbing capacity of the damper 41. Thus, to achieve or even closely approximate so-called critical damping, the deceleration profile of the stepper motor 17 must be controlled at the conclusion of each seek. That may be accomplished, for example, in accordance with the teachings of the aforementioned U.S. patent application Ser. No. 493,131. There are, however, a few observations which are of more general applicability. First, it has been found that if the volume of the elastomeric member 42 is increased while its spring rate or stiffness is reduced (all other factors being held substantially constant), a smaller inertial mass 43 is required for optimal damping. This finding suggests that efficiency of the damper 41 may be increased by adding additional energy absorbing material to the elastomeric member 42, provided that no radical change is made in the natural frequency of the damper 41. Secondly, it has been found that efficiency of the damper 41 depends on the torsional deflection the elastomeric member 42 experiences. This finding suggests that the elastomeric member 42 should be formed from a relatively soft elastomer and should be configured to avoid unnecessary structural rigidity. Energy Absorbing Rubber #C-1002 of E. A. R. Corporation is an example of a suitable material for the elastomeric member 42.

In keeping with this invention, the elastomeric member 42 suitably is an elongated, cylindrical sleeve and the inertial mass 43 is a metallic ring-like member. The cylindrical sleeve 42 and the ring-like mass 43 are coaxial with the capstan 31 so that the damper 41 does not imbalance the band drive 21, and the mass 43 extends radially from the sleeve 42 to provide increased mechanical advantage. In the illustrated embodiment, the mass 42 comprises a relatively thin flange ring 45 which secured to upper or outer end of the sleeve 42 and a thicker load ring 46 which is secured to and suspended from the bottom or inner surface of the flange ring 45. This composite construction of the inertial mass 42 is especially advantageous for Winchester disk drives where the clearance required between the enclosure 27 (FIG. 1) and the damper 41 limits the volume of energy absorbing material that can be embodied in the sleeve 42 while maintaining a suitable spring rate.

CONCLUSION

In view of the foregoing, it will now be understood that the present invention provides an efficient and relatively inexpensive mechanical damper for disk drives having stepper motor driven band drive actuators. As will be appreciated, the solid state construction of the damper is especially advantageous for Winchester disk drives because the damper may be mounted completely within the enclosure of such a disk drive without undue risk of introducing contaminants into the enclosure, but it is not limited to use with such disk drives. Preferably, the deceleration profile of the stepper motor is controlled so that the damper may be tuned for optimum performance, but that is essential only if substantially critical damping is required.

What is claimed is:

1. In a disk drive having a head, an actuator for supporting said head for movement radially with respect to a disk-like recording media, a sealed enclosure containing said head, said actuator and said recording media, and a stepper motor for driving said actuator; said actuator including a band drive having a capstan, and said stepper motor having a drive shaft coupled to said capstan for selectively positioning said head radially with respect to said recording media in response to a seek command; the improvement comprising a solid state damper disposed within said enclosure for damping oscillation of said head upon conclusion of a seek, said damper including
an inertial mass, and
an elastomeric member coupled between said capstan and said inertial mass, said elastomeric member being formed from a low resiliency material and being configured to absorb torsional energy supplied by said mass to damp said oscillation.

2. The improvement of claim 1 wherein
said head tends to oscillate at the conclusion of a seek at a predetermined natural frequency, and
said elastomeric member and said inertial mass are selected to cause said damper to have substantially the same natural frequency.

3. The improvement of claim 1 wherein
said elastomeric member and said inertial mass are symmetrical with respect to said capstan,
whereby said damper is substantially balanced with respect to said band drive.

4. The improvement of claim 3 wherein
said inertial mass is a ring-like member,
said elastomeric member is an elongated sleeve having an inner end secured to said capstan and an outer end secured to said mass, and
said mass and said elastomeric member are concentric with said capstan.

5. The improvement of claim 4 wherein
said head tends to oscillate at the conclusion of a seek at a predetermined natural frequency, and
said elastomeric member and said inertial mass are selected to cause said damper to have substantially the same natural frequency.

6. The improvement of claim 5 wherein said inertial mass comprises
a load ring, and
a flange coupled between the outer end of said sleeve and said load ring for supporting said load ring radially outboard of said sleeve.

7. The improvement of claim 6 wherein
said head tends to oscillate at the conclusion of a seek at a predetermined natural frequency, and
said elastomeric member and said inertial mass are selected to cause said damper to have substantially the same natural frequency.

* * * * *